(12) United States Patent
Muramatsu et al.

(10) Patent No.: US 7,226,082 B2
(45) Date of Patent: Jun. 5, 2007

(54) VIBRATION CONTROL SYSTEM FOR ELECTRIC TILT STEERING

(75) Inventors: Atsushi Muramatsu, Komaki (JP); Hiroyuki Itikawa, Kani (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 290 days.

(21) Appl. No.: 10/972,515

(22) Filed: Oct. 26, 2004

(65) Prior Publication Data

US 2005/0127655 A1 Jun. 16, 2005

(30) Foreign Application Priority Data

Oct. 28, 2003 (JP) .............................. 2003-367379

(51) Int. Cl.
*B62D 1/18* (2006.01)
*B62D 1/16* (2006.01)

(52) U.S. Cl. ...................... 280/775; 280/771; 280/779; 74/493

(58) Field of Classification Search ................ 280/774, 280/777, 779, 771; 74/493, 492
See application file for complete search history.

(56) References Cited

U.S. PATENT DOCUMENTS

| | | | |
|---|---|---|---|
| 5,596,252 A | | 1/1997 | Shimizu et al. |
| 5,772,244 A | * | 6/1998 | Park ............................ 280/780 |
| 5,982,067 A | * | 11/1999 | Sebastian et al. ............ 310/184 |
| 6,085,856 A | * | 7/2000 | Law et al. .................... 180/291 |
| 6,314,829 B1 | * | 11/2001 | Appleyard ..................... 74/493 |
| 6,325,364 B1 | | 12/2001 | Muramatsu |
| 6,390,505 B1 | * | 5/2002 | Wilson ......................... 280/775 |
| 6,454,303 B2 | * | 9/2002 | Ashtiani et al. .............. 280/779 |
| 6,547,043 B2 | * | 4/2003 | Card .......................... 188/267.2 |
| 6,550,568 B2 | * | 4/2003 | Ross ............................ 180/444 |
| 6,752,425 B2 | * | 6/2004 | Loh et al. .................... 280/779 |
| 7,172,241 B2 | * | 2/2007 | Fischer ..................... 296/193.02 |
| 2003/0019704 A1 | | 1/2003 | Aoi et al. |
| 2005/0127655 A1 | * | 6/2005 | Muramatsu et al. ......... 280/774 |

FOREIGN PATENT DOCUMENTS

| | | |
|---|---|---|
| EP | 1 262 392 A2 | 4/2002 |
| JP | A-06-107186 | 4/1994 |
| JP | A-2000-304085 | 10/2000 |
| JP | A-2001-082531 | 3/2001 |
| JP | A-2003-040112 | 2/2003 |

* cited by examiner

*Primary Examiner*—Paul N. Dickson
*Assistant Examiner*—Joseph Rocca
(74) *Attorney, Agent, or Firm*—Oliff & Berridge, PLC

(57) ABSTRACT

A vibration control system for electric tilt steering including a lower stationary and upper moveable column through which is rotatably passed a steering shaft having a steering wheel attached to an distal end projecting into a cabin of a vehicle, the moveable column being linked in vertically tiltable fashion to the end of the stationary column and the stationary column being fixed to a vehicle body, with tilting movement of the moveable column being driven by an electric motor to adjust a movable column vertical position. The system includes a control signal generating device for detecting control signal having control frequency and phase for attenuating vibration input to the steering based on a signal synchronized with operation of a vehicle engine, and a drive controlling device for controlling the electric motor drive based on the control signal, to give oscillation to the steering for attenuating vibration input to the steering.

7 Claims, 6 Drawing Sheets

VIBRATION CONTROL SYSTEM FOR ELECTRIC TILT STEERING

INCORPORATED BY REFERENCE

The disclosure of Japanese Patent Application No. 2003-367379 filed on Oct. 28, 2003 including the specification, drawings and abstract is incorporated herein by reference in its entirety.

BACKGROUND OF THE INVENTION

1. Field of the Invention

The present invention generally relates to a vibration control system for attenuating vibration input in steering equipped with a tilt mechanism for adjusting the vertical position of the steering wheel by means of tilting motion of a moveable column linked tiltably in the vertical direction to the distal end of a fixed column fixed to a vehicle body, and more specifically, relates to a vibration control system for an electric tilt steering system in which adjustment of steering vertical position is driven by an electric motor.

2. Description of the Related Art

Automobile steering has a cantilever support structure where a steering wheel is supported at one end, namely a fixed column end, on the body of the vehicle, and thus resonates in a low-frequency band of about 20–50 Hz corresponding to the idling frequency of a typical engine. Thus, the steering vibrates appreciably with vibratory force at this natural resonance frequency, resulting in the problem of vibration of steering during engine idling. One method for addressing such vibration of steering involves shifting the natural resonance frequency thereof into a higher frequency band than the low-frequency band mentioned above. According to this approach, mounting rigidity of the steering is made higher, or a dynamic damper is attached to the steering.

In recent years, steering systems equipped with electric tilt mechanisms or electric telescopic mechanisms for electrically-powered adjustment of the vertical and front/back positions of the wheel have become widespread. However, such electrically-powered mechanisms increase the mass of the steering, making it more difficult to raise the aforementioned natural resonance frequency. Additionally, in the case of steering equipped with a telescoping mechanism, since resonance frequency changes each time that a user makes positioning adjustments, a resultant problem is the difficulty of achieving vibration damping action with a single dynamic damper.

To cope with the above problem, JP-A-6-107186 discloses, for example, a modified dynamic damper wherein: an upper shaft has a conical circumferential face that decreases in diameter towards its end; a steering tube disposed about the upper shaft support an holder; and an elastic body is supported by the holder such that the elastic body has affixed to a first end thereof a sliding member that slides against the conical face and to the other end thereof a mass, in order to provide an effective deformation interval between the holder and the mass. According to this dynamic damper, the elastic body extends and retracts in association with vertical movement of the upper shaft so that the effective deformation interval changes in a manner proportional to the length of the steering shaft. Thus, the vibration frequency of the dynamic damper changes on the basis of change of the spring constant of the elastic body, whereby even if the length of the steering shaft should change, the vibration frequency of the dynamic damper will be adjusted automatically to correspond therewith.

Another device is a dynamic damper as described in JP-A-2003-40112, wherein the steering column or steering wheel is provided with a plurality of mutually independent dynamic dampers composed of mass members elastically supported by spring members. The natural frequencies of dynamic dampers are set such that at least one is present in a region of frequency variation range of the steering wheel in association with extension and retraction of the steering column, at both the low frequency end and high frequency end with the median value for the frequency variation range between them. This dynamic damper is able to provide advantageous vibration damping effect against changing natural vibration of the steering wheel in association with extension and retraction of the steering column, with a relatively small number of dynamic dampers installed.

However, the former dynamic damper stated above is mounted as a separate component onto the steering tube, and the latter dynamic damper described above is likewise mounted as a separate component onto the steering wheel. In either case, component costs are required and labor is needed to attach the component, so that higher steering cost becomes a problem.

SUMMARY OF THE INVENTION

It is an object of the present invention to provide a vibration control system for steering equipped with a tilt mechanism, capable of easily and inexpensively reducing low frequency steering vibration in steering equipped with a tilt mechanism.

The above and/or other objects may be attained according to at least one of the following aspects of the invention. The following preferred forms of the respective aspects of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

One aspect of the present invention provides a vibration control system for electric tilt steering including a lower stationary column and an upper moveable column through which is rotatably passed a steering shaft having a steering wheel attached to an distal end which projects into a cabin of an automotive vehicle, the moveable column being linked in vertically tiltable fashion to the distal end of the stationary column and the stationary column being fixed to a vehicle body, with tilting movement of the moveable column being driven by an electric motor to adjust a vertical position of the moveable column, said control system comprising: (a) a control signal generating device for generating control signal having control frequency and control phase for attenuating vibration input to the steering on the basis of a signal synchronized with operation of a vehicle engine, and (c) a drive controlling device for controlling drive of the electric motor on the basis of the control signal so that the electric motor is driven to give oscillation to the steering in order to attenuate vibration input to the steering.

According to the present invention of construction described hereinabove, the electric motor that drives electric tilting of the steering is applied with a control signal having control frequency and control phase derived on the basis of a signal synchronized with operation of the vehicle engine, whereby the electric motor is driven to apply oscillation to the steering. Oscillation from the electric motor effectively attenuates low-frequency vibration input applied to steering on the basis of engine idling vibration and the like. Also, since the electric motor for driving electric tilting of the steering can be used to provide oscillation for attenuating input vibration, there is no need to provide a separate component for suppressing vibration, so that component costs and labor entailed in attaching components are avoided. Preferably, the electric motor may be selected from DC motors, blushless DC motors, stepper motors, or the like.

According to one preferred form of the invention, the vibration control system further comprises a vibration sensor attached to the steering, wherein the drive controlling device executes drive control of the electric motor on the basis of the control signal updated on the basis of an adaptive control method, with reference to vibration sensing results by the vibration sensor. By carrying out drive control of the electric motor by means of the control signal updated on the basis of the adaptive control method with reference to vibration sensing results by the vibration sensor in this way, vibration input to the steering can be attenuated appropriately with reference thereto.

According to another preferred form of the invention, the vibration control system further comprises a vibration damping device for controlling drive of an electric oscillation member installed on the vehicle on the basis of the control signal so that vibration transmitted from an engine to a body of the vehicle is damped. With this arrangement, it is possible, in addition to attenuating vibration input to the steering, to control drive of the electric motor of the electric oscillation member on the basis of the control signal in order to damp vibration transmitted from the engine to the body of the vehicle, enabling more effective utilization of the control system.

Preferably, the electric oscillation member is installed in an engine mount that supports engine on the body of the vehicle in a vibration damping fashion. This arrangement makes it possible to damp vibration of the engine per se, thereby more reliably suppressing transmission of vibration to the vehicle body.

According to still another preferred form of the invention, the vibration control system is integrally provided with the steering or with the steering and vibration sensor. By integrally providing the vibration control system with the steering or with the steering and vibration sensor, compact installation of the vibration control system on the steering is possible so that less mounting space is needed.

According to the present invention, by applying to the electric motor which drives electric tilting of the steering a control signal having control frequency and control phase derived on the basis of a signal synchronized with operation of the vehicle engine, low frequency vibration input to the steering can be damped easily. Also, since the invention does not require providing any separate components for vibration control, vibration control costs can be reduced.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
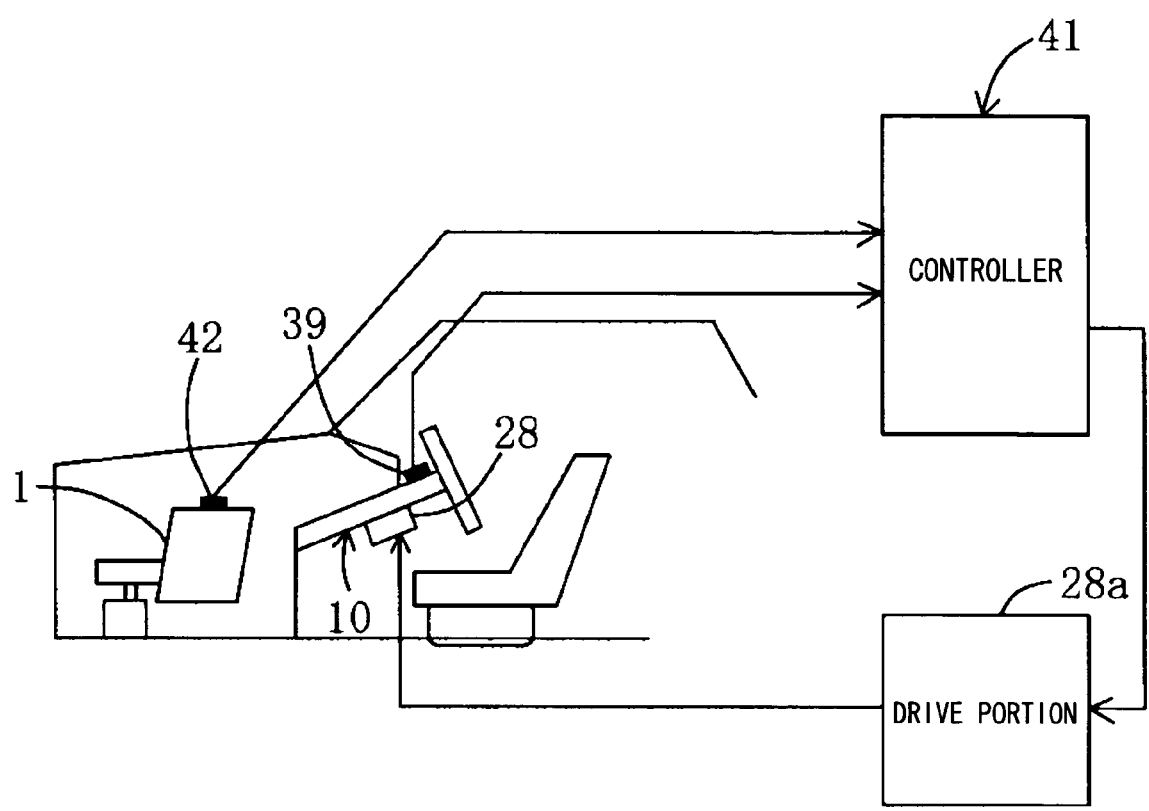
FIG. 1 is a schematic illustration for showing an arrangement of a vibration damping system for electric tilt steering according to one preferred embodiment of the invention.
Figure 2:
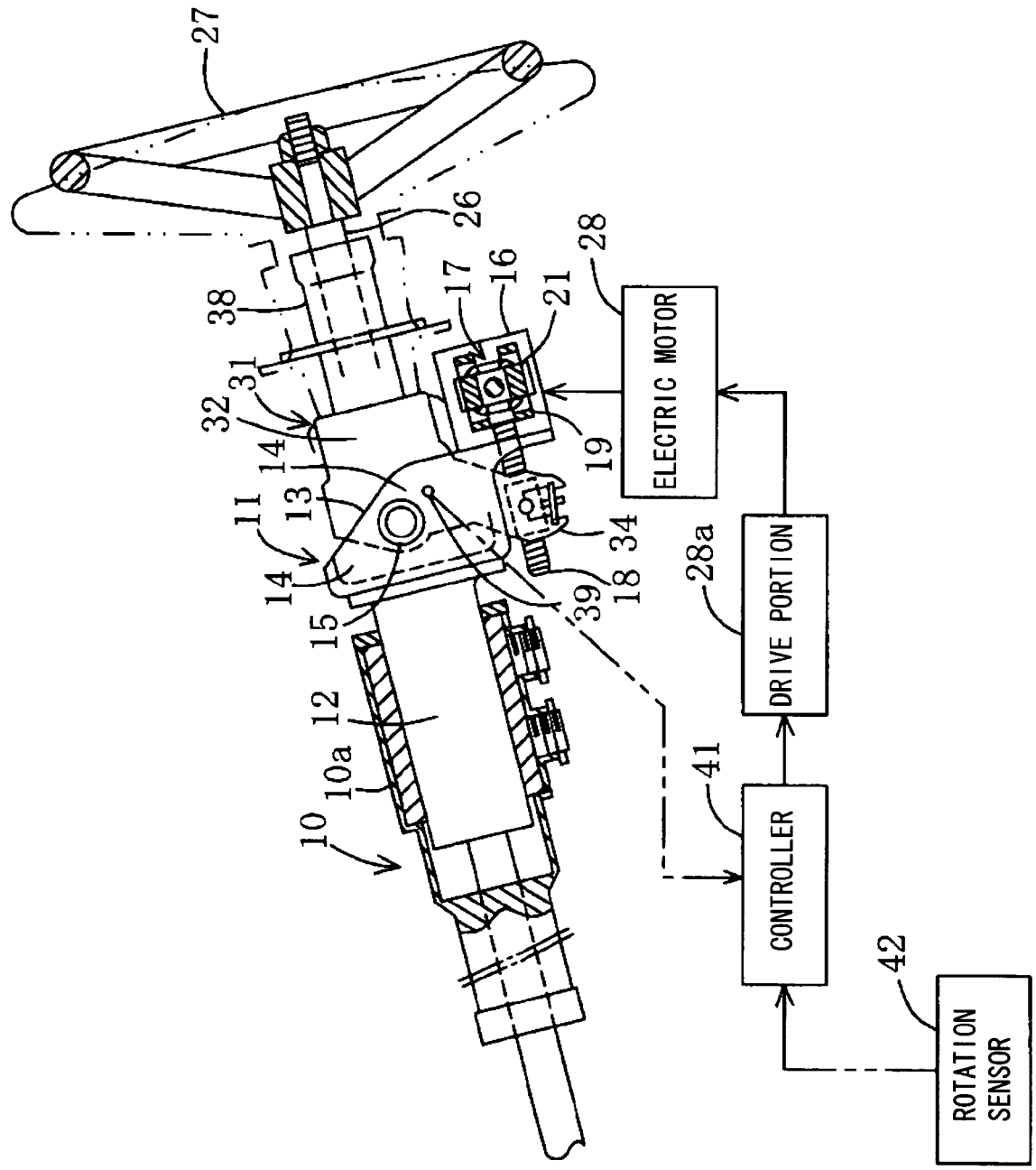
FIG. 2 is a partly sectional front view schematically showing the steering shown in FIG. 1.
Figure 3:
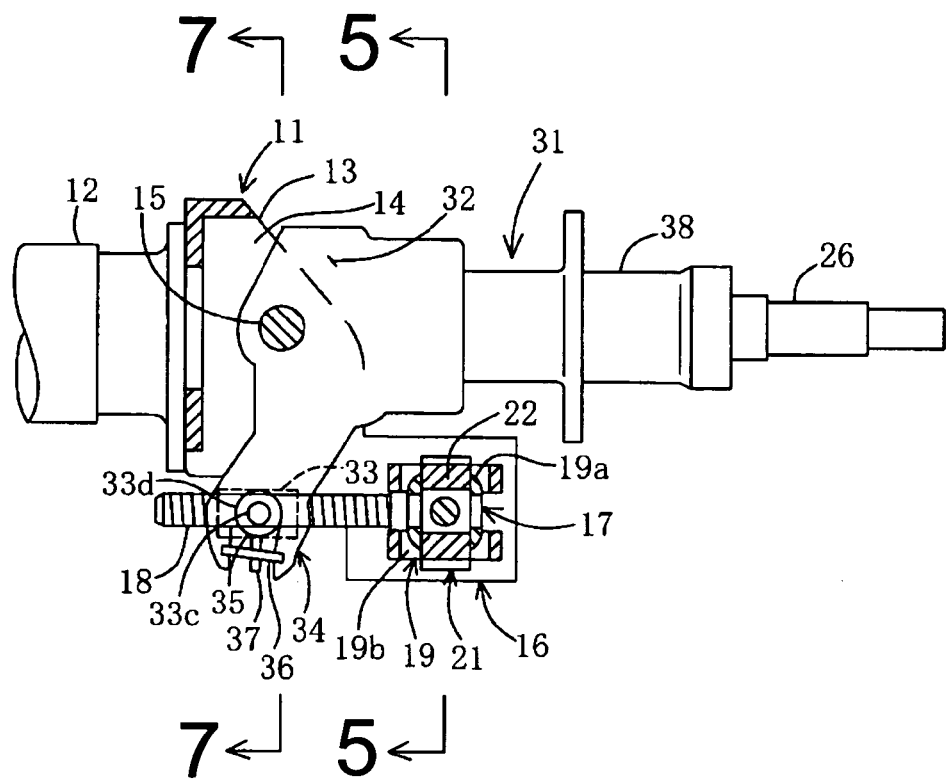
FIG. 3 is a partly sectional front view schematically showing a principle part of the steering shown in FIG. 1.
Figure 4:
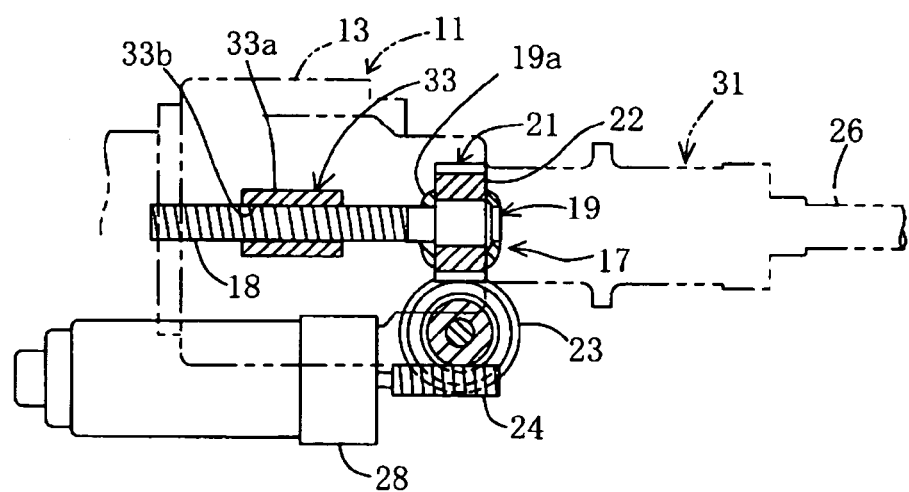
FIG. 4 is a partly plane view schematically showing a drive screw component of the steering shown in FIG. 1.
Figure 5:
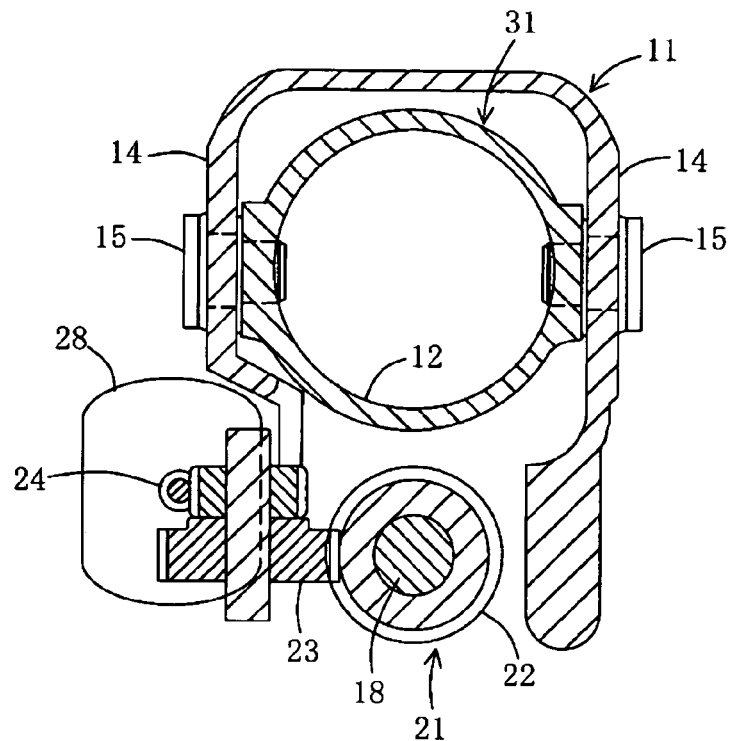
FIG. 5 is a cross sectional view taken along line 5—5 in FIG. 3.
Figure 6:
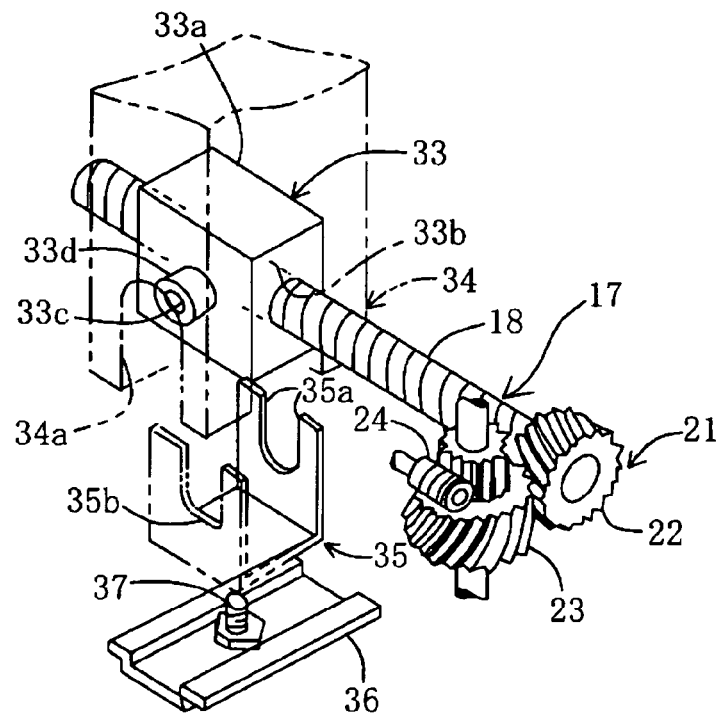
FIG. 6 is an exploded perspective view schematically showing a moving portion component of the steering shown in FIG. 1.
Figure 7:
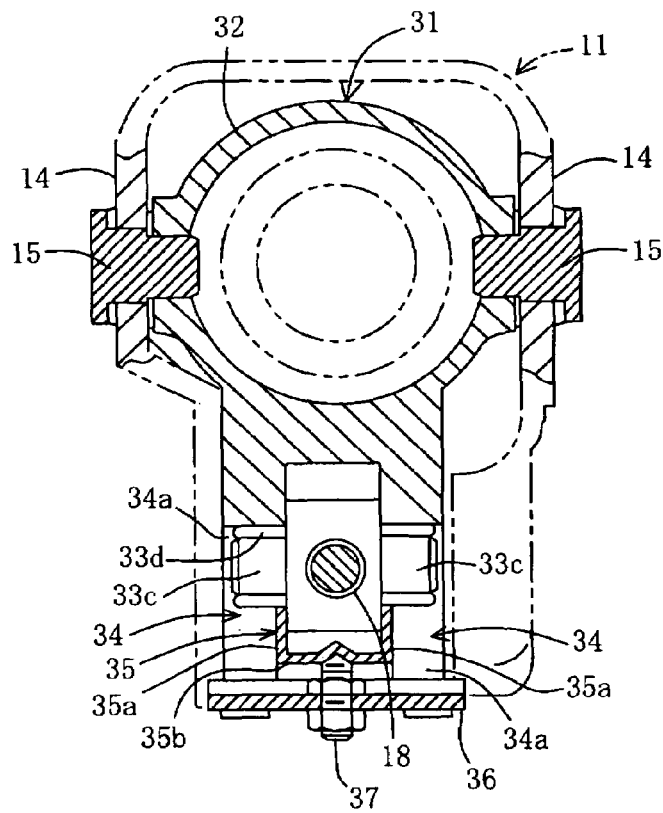
FIG. 7 is a cross sectional view taken along line 7—7 of FIG. 3.

There will be described one preferred embodiment of the invention with reference to the accompanying drawings. FIG. 1 is a block diagram showing in simplified form the arrangement of a vibration damping mechanism for electric tilt steering. FIG. 2 is a partly sectional front view showing in simplified form the arrangement of electric tilt steering. FIG. 3 shows a fragmentary view of the steering in partly sectional front view. FIG. 4 shows in simplified form the drive screw components, in bottom view. FIG. 5 is a cross sectional view taken along line 5—5 in FIG. 3. FIG. 6 is an exploded perspective view of the moving portion components; and FIG. 7 is a cross sectional view taken along line 7—7 in FIG. 3.

Electric tilt steering (hereinafter simply denoted as steering) 10 comprises a tubular slidably mated column 10a; a stationary column 11 installed slidably within the slidably mated column 10a; a moveable column 31 attached tiltably in the vertical direction to the upper end of the stationary column 11; a steering shaft 26 passed rotatably through the inside of the stationary column 11 and moveable column 31, and having a steering wheel 27 affixed to the distal end thereof which projects into to a cabin; an electric motor 28 for driving the moveable column 31; and a controller 41 for controlling operation of the electric motor 28. This steering 10 is affixed to the vehicle body at the slidably mated column 10a by a bracket (not shown).

The steering 10 is provided with a telescopic mechanism wherein stationary column 11 slides inside the slidably mated column 10a. While described herein as being manually operated, an electric telescopic mechanism would be possible as well. The steering 10 is also provided with a tilting mechanism wherein the moveable column 31 tilts by being driven by the electric motor 28. Left/right and front/back orientation of the steering 10 is aligned with left/right orientation in FIG. 1 and front/back with respect the plane of the paper.

The stationary column 11 comprises a tubular insert tube portion 12 which fits inserted into the slidably mated column 10a, and a joint portion 13 attached to one end of the tubular insert portion 12 (the right end in FIG. 2). The joint portion 13 is provided with a pair of side panel portions 14 disposed in opposition to each other a predetermined distance apart front-to-back, with the moveable column 31 tiltably linked at a moving linkage portion 32 thereof, between the side panel portions 14 by means of a pair of supports 15. At the lower side of the side panel portions 14, a rightward-projecting drive support portion 16 is integrally formed with the side panel portion 14, and a drive screw 17 is disposed on the drive support portion 16. The drive screw 17 comprises a threaded shaft portion 18 and a swivel support portion 19. The threaded shaft portion 18 rotates driven, via a gear mechanism 21, by the electric motor 28 installed on drive support portion 16. The electric motor 28 may be selected from electric motors known in the art, such as DC motors, blushless DC motors, and stepper motors.

The swivel support portion 19 is provided with a spherical portion 19a situated at the axial right end of the threaded shaft portion 18, with the spherical portion 19a rotating in a predetermined range inside a swivel bearing portion 19b such that the shaft portion 18 swivels in association with spherical portion 19a. As shown in FIGS. 5 and 6, the gear mechanism 21 comprises two screw gears, namely, a transmission-receiving gear 22 and a transmission gear 23. The transmission-receiving gear 22 is disposed on the swivel support portion 19 and the transmission gear 23 is axially supported on the drive support portion 16, whereby the transmission gear 23 turns the threaded shaft portion 18 via a worm gear mechanism 24 or the like, by means of the electric motor 28.

As shown in FIG. 3, the moveable column 31 has a moving linkage portion 32 tiltably linked to the joint portion 13 of the stationary column 11, and an integrally moveable cylinder portion 38 disposed concentrically extending in the opposite direction of stationary column 11 from the moving linkage portion 32. The moving linkage portion 32 is positioned between the side panel portion 14 of the joint portion 13 and linked thereto by means of the supports 15 as described above. As shown in FIG. 3 and FIG. 6, below the moving linkage portion 32 there is disposed a moving portion 33. The moving portion 33 is formed of an internal screw portion 33b situated inside a cubic box body 33a. By means of the internal screw portion 33b moving along the axial direction of the threaded shaft portion 18 of the drive screw 17, the moveable column 31 moves in the vertical direction.

The moving portion 33 is disposed on the opposite end from the steering wheel 27, with the swivel support portion 19 of the drive screw 17 situated therebetween. The moveable column 31 is subjected to load received from the hands of the driver operating the steering wheel 27, and from the weight of the steering wheel 27, steering shaft 26, and so on, whereby the moveable column 31 is subjected to constant downward loading. The moving portion 33 provided to the moveable column 31 rotates about the supports 15 of the moveable column 31 and stationary column 11, and the moving portion 33 moves in a direction away from the swivel support portion 19 of the drive screw 17. By applying force urging it away from the swivel support portion 19 in this way, tensile load is applied by the moving portion 33 to the threaded shaft portion 18 of the drive screw 17.

The moving portion 33 is rotatably installed between a pair of support projections 34 of forked configuration projecting down from the moving linkage portion 32. As shown in greater detail in FIG. 7, a bearing 33d is disposed on a rotary shaft 33c of the moving portion 33 which is inserted into a bearing groove 34a, the two bearing end portions 35a of a shaft fixing member 35 being positioned at locations corresponding to the support projections 34, with the bearing 33d supported between the bearing groove 34a and the two bearing end portions 35a of shaft fixing member 35 so that the rotary shaft 33c is secured via bearing 33d.

A fixing support plate 36 is installed on the support projections 34 so as to be positioned below the shaft fixing member 35, and the bottom portion 35b of the shaft fixing member 35 is urged upward by means of an urging fastener screw 37 provided to the fixing support plate 36, to thereby securely attach the bearing 33d of the moving portion 33. As described above, the moving portion 33 threadably mates with the threaded shaft portion 18 of the drive screw 17 on the stationary column 11 side, and the threaded shaft portion 18 turns driven by the electric motor 28, whereby the moving member 33 moves in the axial direction thereof, with the moveable column 31 tilting in the vertical direction depending on the movement of the moving body 33. At this time, rotation and swivel appropriate to the change in angle of the moveable column 31 with the stationary column 11 produced by tilting of the moveable column 31, take place so that the direction in which force acts on the threaded shaft portion 18 of the drive screw 17 and on the moving member 33 is always in the same direction, thus avoiding the threaded shaft portion 18 and the moving member 33 from being subjected to unwanted force.

In the electric tilt mechanism of the steering 10, the moveable column 31 is linked to the stationary column 11 in vertically tilting manner, and the moving portion 33 which moves together with the moveable column 31 is rotatably disposed below the moveable column 31, and the swivel support portion 19 of the drive screw 17 comprising the swiveling threaded shaft portion 18 and swivel support portion 19 is disposed on the stationary column 11 side, with the threaded shaft portion 18 swiveling. Additionally, the swivel support portion 19 is positioned between the moving portion 33 and the steering wheel 27, with the threaded shaft portion 18 and internal screw portion 33b formed in the moving portion 33 threadably mating to give an electric tilt steering drive support structure. By so doing, the moveable column 31 can undergo tilt operation in a consistently smooth manner without any rattling, the need for a high degree of precision in the steering 10 overall is obviated, and assembly can be done easily to provide more consistent quality.

The description now turns to a controller 41 for controlling the electric motor 28.

The controller 41 comprises a control portion consisting of a microcomputer. To the controller 41 are connected a vibration sensor 39 for sensing vibration excited in the steering 10 and an engine operation detecting sensor in the form of a rotation sensor 42 for sensing engine crankshaft rotation pulses and ignition pulse signals. In preferred practice, controller 41, together with vibration sensor 39, is integrally formed with the stationary column 11 of the steering 10, whereby the control system can be made compact and attached compactly in the steering 10 without projecting appreciably. The controller 41 performs vibration input control on the basis of an adaptive control method using, for example, a delayed harmony synthesizer least mean square filter (hereinafter DXHS LMS filter). It should be noted that the engine operation detecting sensor may be selected any know sensors capable of generating a signal synchronized with operation of the engine, beside the rotation sensor 42.

Figure 8:
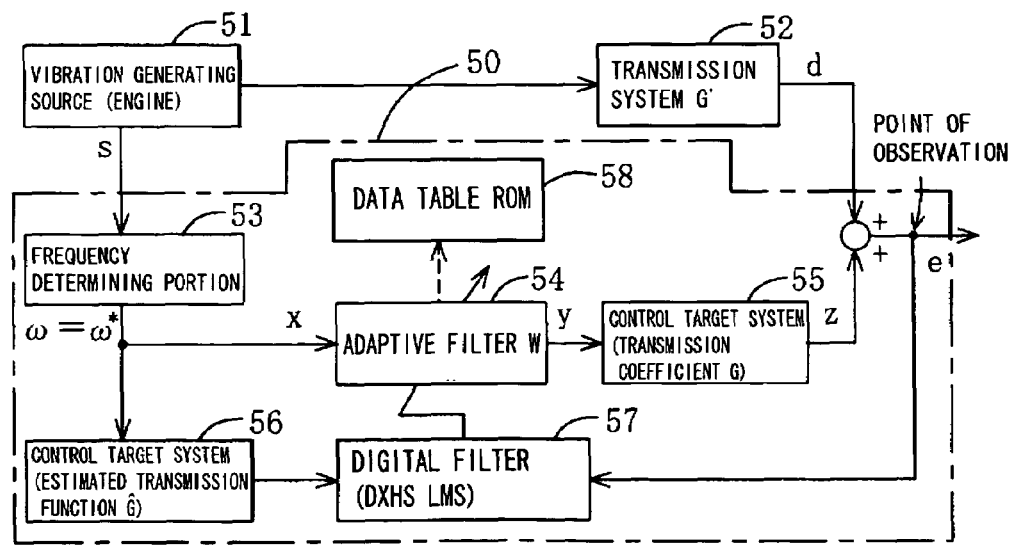
FIG. 8 is a block diagram showing an adaptive control system using DXHS LMS filter.

As shown in the block diagram in FIG. 8, control in this adaptive control method involves the steps of extracting by means of the rotation sensor 42 the engine crankshaft rotation pulses or ignition pulse signals from the vibration source, namely, the engine 51, and producing a pulse signal s synchronized with the control-targeted signal by means of wave shaping, which is processed in adaptive control system 50. Vibration from the engine 51 is transmitted through a transmission system 52(G') as external force d to the steering 10 in the cabin. Pulse signal s is converted to a sine wave synchronized with the control-targeted signal by a frequency determining portion 53 to give a control-targeted signal x. The control-targeted signal x is subjected to amplitude compensation and phase compensation by an adaptive filter 54 (W) which is a function of an amplitude compensation coefficient and a phase compensation coefficient, and output in the form of a sine wave output signal y of this amplitude and phase. The output signal y is input to a control target system 55 (transmission coefficient G), and output through steering 10 as a processed signal z.

To processed signal z is added external force d, which represents engine vibration passed through transmission system 52(G'), and is sensed in the form of an error signal e representing difference from a benchmark by the vibration sensor 39 as the observed value. Using this error signal e and an estimate calculated by an estimated transmission function 56, the adaptive filter 54 (W) is serially updated by a digital filter 57. The estimated transmission function 56 is derived in advance by means of impulse response measurement, frequency sweep vibration testing, or the like, and is referred to each time that the adaptive filter is updated. In this way, an optimal filter coefficient is calculated for each arbitrary rotation speed (frequency), and an output signal y having been subjected to amplitude compensation and phase compensation by means of the filter coefficients and synthesized into a sine wave signal for output is input to the control target system (transmission function G), a processed signal z is output. By means of this processed signal z, suppression of external force d having passed through transmission system 52(G') is carried out. In actual practice, output signal y from controller 41 is output to a drive portion 28a of the electric motor 28 provided to steering 10, and the electric motor 28 is driven by means of a drive signal from the drive portion 28a.

In the embodiment described above, a control signal having control frequency and control phase synchronized with vehicle engine operation derived by an adaptive control method is applied to the drive portion 28a of the electric motor 28 that drives the electric tilt mechanism of the steering 10, whereby oscillation or vibration is applied from the electric motor 28 to the stationary column 11 of the steering 10. By means of this oscillation, it is possible to reliably attenuate low frequency vibration input based on engine vibration and the like applied to the steering 10. The electric motor 28 that drives the electric tilt mechanism of the steering 10 can also be utilized for attenuating vibration input. Thus, the need for a separate component for vibration damping is eliminated, and component costs and the labor entailed in component installation become unnecessary, so that vibration control costs are lower than in the past. As will be apparent from the foregoing description, the controller 41, the vibration sensor 39, and the drive portion 28a cooperate to provide a control signal detecting device and a drive controlling device in the present embodiment.

Figure 9:
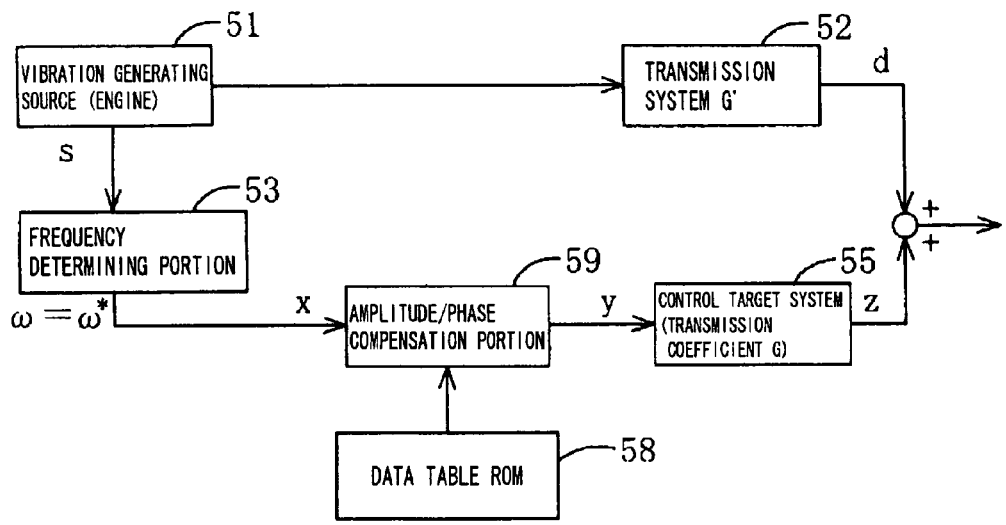
FIG. 9 is a block diagram showing a control system storing and using as a data table optimal filter coefficients obtained by the adaptive control system shown in FIG. 9.

Further, whereas in the present embodiment vibration control by the electric motor 28 of the steering 10 is accomplished by means of an adaptive control method, it is not limited thereto. For example, active control is also carried out through a simple method using the DXHS LMS filter 50 described above as shown in FIG. 7, for example. In this method, an optimal filter coefficient is derived for each arbitrary rotation speed (frequency), and this optimal filter coefficient data is stored in the form of a data table. This data table is accessed in the form of ROM 58 and applied to the controller 41 to perform active control. As will be specifically apparent from FIG. 9, a crankshaft rotation pulse or the like from the vibration generating source 51, such as the car engine of signal source is acquired by a sensor, determined by frequency determining portion 53 to be the control target frequency ω, and converted for output into a sine wave control target signal x of the control target frequency ω. This control target signal x is subjected by amplitude/phase compensation portion 59 to amplitude compensation and phase compensation by a filter coefficient from the aforementioned data table ROM 58, and output in the form of a sine wave output signal y. The output signal y is input to control target system 55 (transmission function G), a processed signal z is output, and suppression of external force d having passed through transmission system 52(G') is carried out by means of this processed signal z. This arrangement allows the controller 41 to eliminate the sensor for sensing vibration, and makes it possible to simplify the structure of the controller 41 in comparison with that in an adaptive control device. Thus, the costs of vibration control can be made cheaper. In this embodiment, the controller 41 and the drive portion 28a cooperate to provide a control signal detecting device and a drive controlling device.

The description now turns to a vibration control system according to yet another embodiment of the invention.

Figure 10:
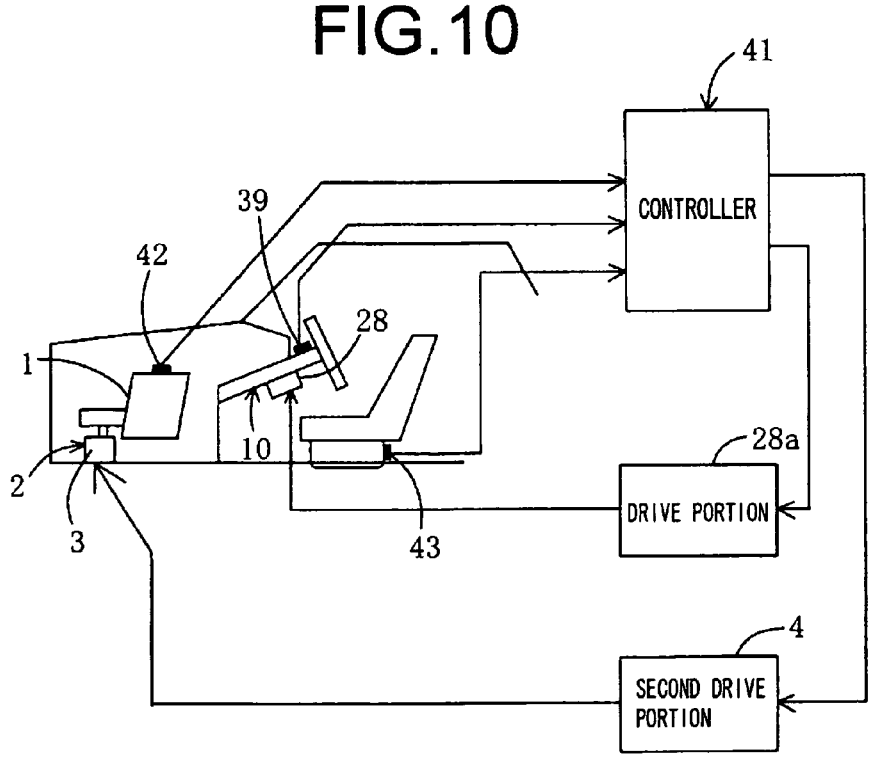
FIG. 10 is a schematic illustration for showing an arrangement of a vibration damping system for electric tilt steering according to another preferred embodiment of the invention.

According to this embodiment as shown in FIG. 10, the present system further comprises a vibration damping device, such as an engine mount 2 having an oscillation member 3. Specifically, drive control of the electromagnetic oscillation member 3 of the engine mount 2, which supports the engine 1, is performed on the basis of the aforementioned control signal, in addition to adaptive control of the electric motor 28 of the steering 10 by the aforementioned controller 41. Namely, vibration control system is designed such that vibration elimination of the steering 10, as well as vibration elimination control at the seat location by means of engine vibration, are accomplished by means of adaptive control by the controller 41. In construction, a vibration sensor 43 affixed to the seat is connected to the input side of the controller 41, in addition to the aforementioned vibration sensor 39 and rotation sensor 42. To the output side of the controller 41, a second drive portion 4 of the oscillation member 3 is connected, in addition to the aforementioned drive portion 28a. The engine mount 2 may be an electromagnetic mount comprising an oscillation member operated by means of an electromagnetic actuator. Alternatively, the engine mount 2 is a pneumatic mount comprising an oscillation member operated by means of a pneumatic actuator wherein an air chamber interior is switched between different air pressures, such as an atmospheric pressure condition and negative pressure condition, by means of switching an electromagnetic valve. Adaptive control is as described previously. In this case, drive control of the electromagnetic actuator or electromagnetic valve is performed by means of the output signal. In actual practice, the control signal from the controller 41 is output to the second drive portion 4 for driving the oscillation member 3 provided on the engine mount 2, and the vibrator device 3 is driven by a drive signal from the second drive portion 4. JP-A-2001-82531 and JP-A-

2000-304085 disclose know examples of electromagnetic type and pneumatic type engine mounts, respectively.

In this embodiment, since the controller 41 can be used for both vibration elimination of the steering 10, as well as vibration elimination of vibration transmitted from the engine 1 at the seat location, the controller 41 can be utilized efficiently. In this embodiment as well, there can be employed in place of adaptive control a simple method wherein the aforementioned optimal filter coefficient data is stored as a data table, and the data table is accessed in the form of ROM 58 and applied to the controller 41 to perform active control. In the aforementioned other embodiment, it would be possible to damp vibration in the cabin by carrying out drive control of an oscillation member disposed at another location in the cabin, rather than the oscillation member disposed on the engine mount.

In the illustrated embodiments, a DXHS LMS filter is used as the adaptive filter, but it would be possible to instead use another adaptive filter such as a Filtered-X LMS filter. As the control method, it would be possible to use another control method besides adaptive control or a simple method employing a data table containing optimal filter coefficient data. As regards the electric tilt device as well, the structure thereof is not limited to that shown in preceding embodiment, but is sufficient that it be driven by an electric motor.

The electric tilt steering vibration control system of the present invention is useful because a control signal is applied to the electric motor which drives electric tilt, low frequency vibration input in the steering is suppressed, and there is no need to provide a separate component for vibration control.

The principle of the present invention may be executed according to classical control theory, such as feedback control. For instance, it is possible to use feedback control system wherein control of frequency, and as needed magnitude, of a control signal applied to the electric motor 28 is executed on the basis of detected signal by means of the vibration sensor 39 attached to the steering 10.

It is also to be understood that the present invention may be embodied with various other changes, modifications and improvements, which may occur to those skilled in the art, without departing from the spirit and scope of the invention defined in the following claims.

What is claimed is:

1. A vibration control system for electric tilt steering including a lower stationary column and an upper moveable column through which is rotatably passed a steering shaft having a steering wheel attached to a distal end which projects into a cabin of an automotive vehicle, the moveable column being linked in vertically tiltable fashion to the distal end of the stationary column and the stationary column being fixed to a vehicle body, with tilting movement of the moveable column being driven by an electric motor to adjust a vertical position of the moveable column, said control system comprising:

a control signal generating device for generating control signal having control frequency and control phase for attenuating vibration input to the steering on the basis of a signal synchronized with operation of a vehicle engine, and a drive controlling device for controlling drive of the electric motor on the basis of the control signal so that the electric motor is driven to give oscillation to the steering in order to attenuate vibration input to the steering.

2. A vibration control system according to claim 1, further comprising a vibration sensor attached to the steering, wherein the drive controlling device executes drive control of the electric motor on the basis of the control signal updated on the basis of an adaptive control method with reference to vibration sensing results by the vibration sensor.

3. A vibration control system according to claim 1, further comprising a vibration damping device for controlling drive of an electric oscillation member installed on the vehicle on the basis of the control signal so that vibration transmitted from an engine to a body of the vehicle is damped.

4. A vibration control system according to claim 3, wherein the electric oscillation member is installed in an engine mount that supports the engine on the body of the vehicle in a vibration damping fashion.

5. A vibration control system according to claim 1, wherein the system is integrally provided with the steering.

6. A vibration control system according to claim 2, wherein the system is integrally provided with the steering and the vibration sensor.

7. A vibration control system according to claim 1, wherein the control signal generating device comprises an engine operation detecting sensor for detecting a signal synchronized with operation of a vehicle engine.

* * * * *